July 22, 1947.  C. T. McCOY  2,424,481
ELECTRICAL SYSTEM
Filed Sept. 30, 1944  2 Sheets—Sheet 2
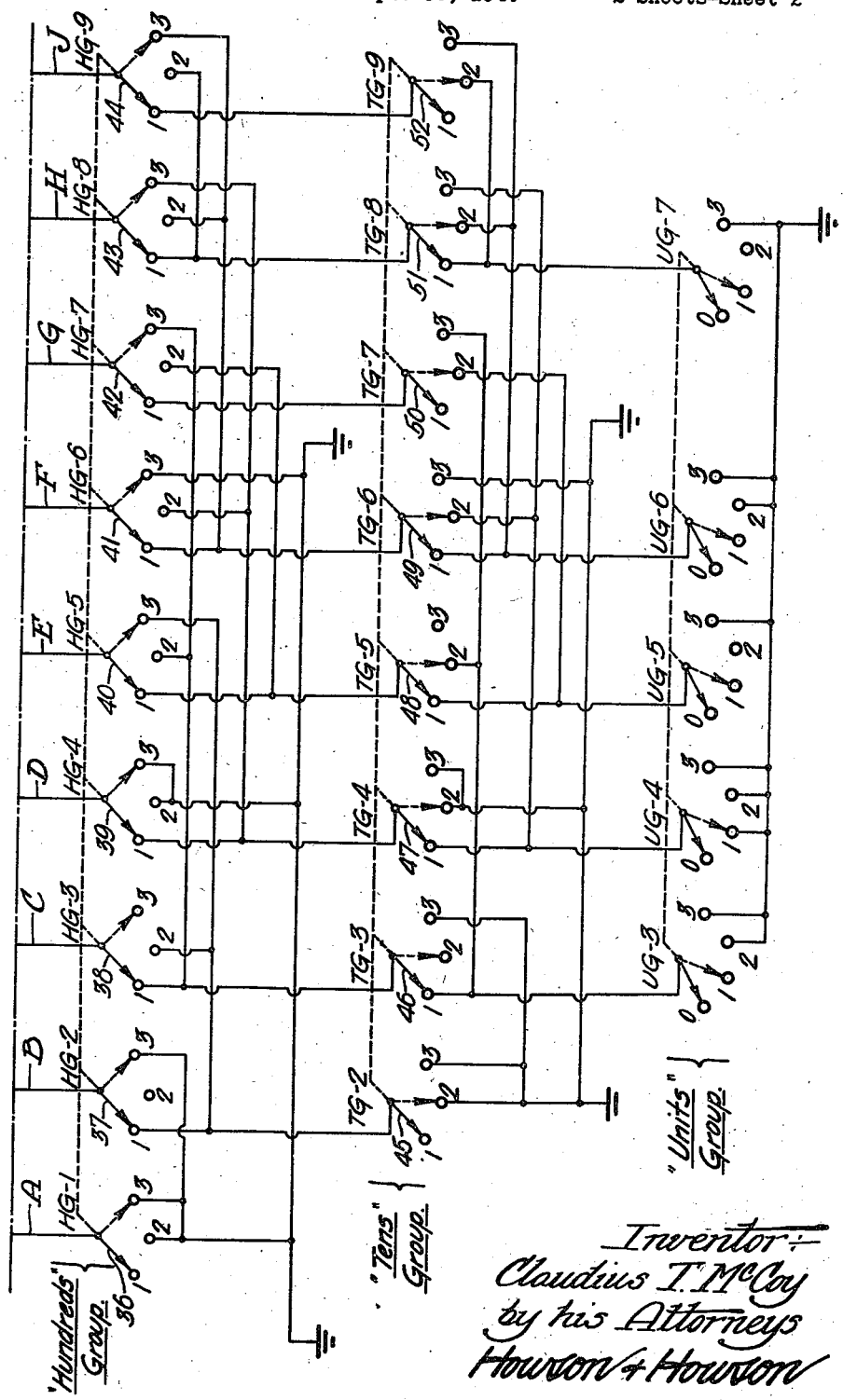
FIG. 4ᵇ.
Inventor:
Claudius T. McCoy
by his Attorneys
Howson & Howson Patented July 22, 1947

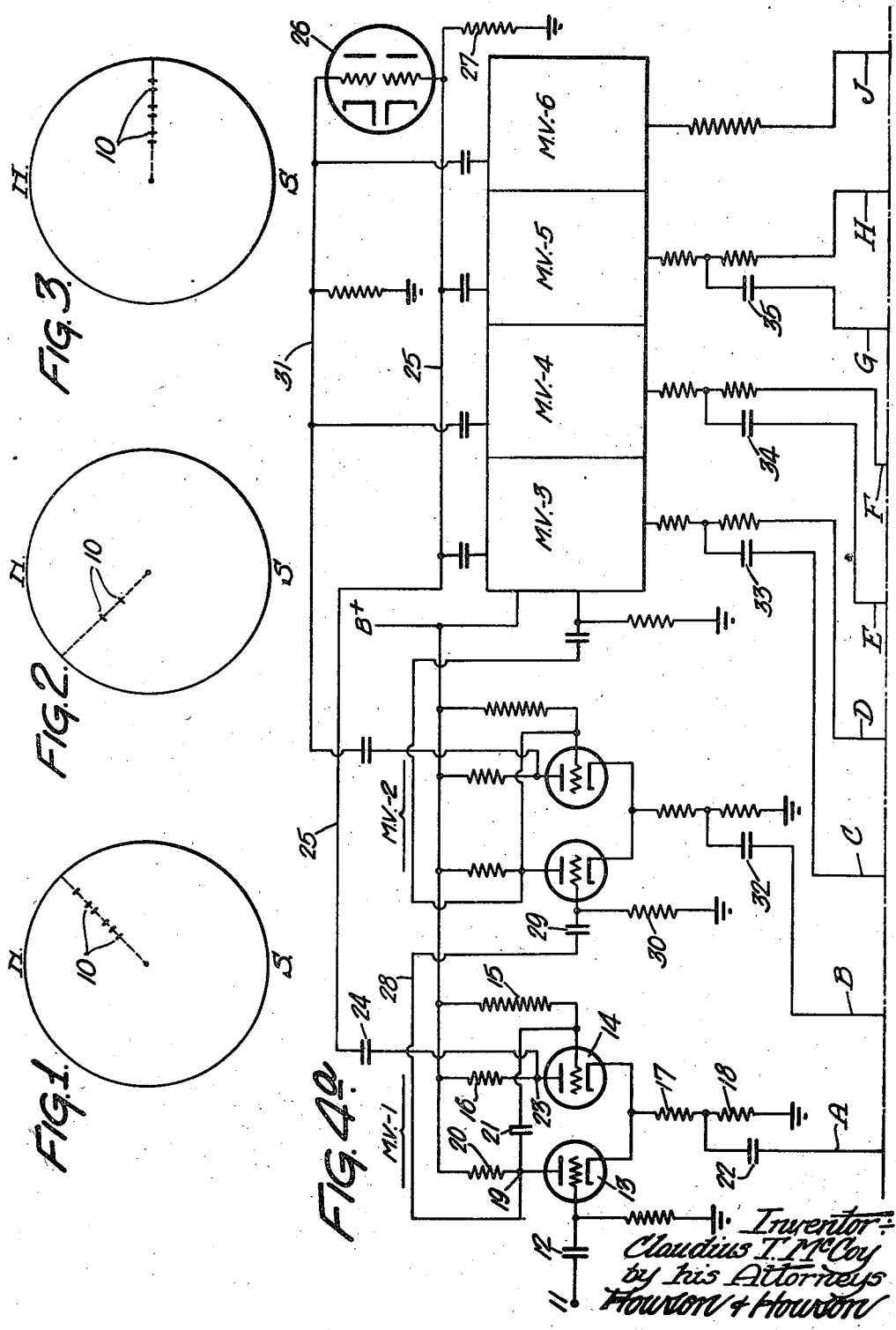

2,424,481

UNITED STATES PATENT OFFICE 2,424,481

ELECTRICAL SYSTEM

Claudius T. McCoy, Narberth, Pa., assignor, by mesne assignments, to Philco Corporation, Philadelphia, Pa., a corporation of Pennsylvania Application September 30, 1944, Serial No. 556,615

10 Claims. (Cl. 177—380)

This invention has to do with radar beacons and relates more especially to a switching system by means of which a beacon transmitter can quickly be adjusted or readjusted, at will, to operate in conformity with any chosen one of a number of predetermined available code combinations, without requiring the exercise of skill or a high order of mental effort to effectuate the necessary change-overs.

The kind of system to which the present invention is particularly applicable is one which may be employed to enable aircraft to determine their positions with respect to stationary land beacons or with respect to beacons mounted on aircraft carriers. In such a system the aircraft is equipped with a transmitter which, under the control of the navigator or pilot, is capable of propagating trains of interrogating electric pulses, uniformly spaced and effective to activate the beacon's transmitter, which latter instantly sends back to the interrogating aircraft a series of pulses arranged in conformity with an identifying code—the aircraft being further equipped with a receiver which is operative to translate the code pulses from the answering beacon into a corresponding visible indication, which enables the navigator or pilot not only to identify the beacon but to determine at once its direction and approximate distance.

For various reasons it may be desirable, from time to time, to change a beacon transmitter from one code combination to another; and it may be necessary to make such changes quickly and frequently, and of course, accurately.

Heretofore, a change of code has entailed the opening or closing of numerous individual switches and has required the services of a skilled attendant or engineer who could figure out from the desired code which of the switches must be opened and which must be closed. This not only involved a considerable mental effort but, what was more important, consumed a substantial amount of time and, in addition, was subject to serious possibility of error. Through utilization of switching equipment according to the present invention, the code can be changed almost instantaneously with substantially no possibility of error.

Referring to the drawings:

Figures 1, 2, and 3 show, in each instance, the face of a radar viewing screen on which are depicted groups of luminous spots in accordance with three different code numbers corresponding respectively to individual beacons;

Figures 4a and 4b constitute jointly a single schematic diagram of the portions of a radar beacon with which the present application is concerned. Figure 4a should be placed above Figure 4b and the matching conductors joined in order to complete the schematic.

Figures 1, 2, and 3 are views, as seen by the pilot or navigator of an aircraft, of a radar viewing screen on which is registered, at different times, visible signals indicating the identity and direction of a radar beacon—which may be on an aircraft carrier or at some land location. In each instance the signal consists of a radial line of luminous spaced spots arranged to spell out an identifying code number. For example, in Figure 1 the luminous spots 10, reading from the center of the screen, are disposed in groups of three, two, and one respectively—which spells out the number "321." In addition, the direction of the radial line along which the luminous spots are disposed is indicative of the direction of the beacon. Additional means with which we are not here concerned may also provide an indication as to the distance from the aircraft to the beacon.

In Figure 2 the code number indicated is construed as "110." It will be observed that there are only two spots—zero, the units digit in the code number "110," being represented by the absence of a spot in the units group. In order to use a code number such as "110" it must be understood that every code number has three digits.

In Figure 3 the code number displayed is "222."

It is hypothetically possible with such a system to employ any number as a code; but it is not practicable to use just any number where readings must be made on sight—that is to say, instantly and accurately. Experience has shown that where a single group contains more than three spots there is danger of faulty recognition; and, for the same reason, it has been found inadvisable to employ a total of more than six spots. Also, to facilitate quick recognition, it is preferable to avoid the use of a zero in any position other than the units position. In addition, the smaller the number of spots per code number, the greater is the economy of transmitter power. It would not be advisable, for instance, to employ the code number "421" because that number contains a group of four spots which is apt to be mistaken for a "3"; and it would be unwise to employ such a code number as "303" because the zero (blank) middle digit would tend to be confusing.

A code limited to three digits, totaling no more than six spots per code number and a maximum number of three spots per digit and including zero only in units position, embraces, in all, twenty-six combinations, as follows:

| | | | |
|---|---|---|---|
| 110 | 123 | 213 | 311 |
| 111 | 130 | 220 | 312 |
| 112 | 131 | 221 | 320 |
| 113 | 132 | 222 | 321 |
| 120 | 210 | 230 | 330 |
| 121 | 211 | 231 | |
| 122 | 212 | 310 | |

The system illustrated diagrammatically in Figures 4a and 4b is designed to be quickly adjusted to propagate, collectively, groups of identifying impulses in accordance with any of the above listed code numbers, and to be quickly changed over from any listed code number to any other listed code number. This is accomplished by means of three groups of individually operable rotary gang switches labeled "Hundreds group," "Tens group," and "Units group" respectively. The system includes six vacuum tube multivibrators in tandem, labeled MV—1 to MV—6 inclusive, and constituting, collectively, what is generally referred to as a coder. The number of multivibrators making up the coder corresponds to the maximum number of spots required to form a code combination according to the above list—it being remembered that no more than six spots are employed. It is to be noted, however, that there is no actual limit as to the code numbers that might be employed and, likewise no limit as to the possible number of multivibrators or the number of groups of code switches. The restriction to twenty-six code numbers was dictated entirely by expediency—it having been found that false readings were apt to occur under distress conditions if the above-stated limitations were not observed.

Usually, a multivibrator is a continuous oscillation generator; but that is not true of the multivibrators about to be described. Here, each multivibrator is designed to generate only a single outgoing pulse. In addition, each multivibrator, except the last (MV—6), is designed to produce a second pulse which is used to trigger the succeeding multivibrator. When the sum of the digits making up the code number is six (e. g. 321) all six multivibrators are employed; but when the sum of the digits is less than six (e. g. 211) a correspondingly smaller number of multivibrators are employed. In the last mentioned case only four multivibrators would be required because the sum of the digits of code number "211" is four.

The problem with which the present invention is concerned is to obtain the proper time intervals between outgoing pulses, so that spots appearing on the radar viewing screen will be spaced to spell out the code number. For example, in propagating the code number "321" it is apparent that the first three outgoing pulses must be closely spaced to form a "3" group and that the last pulse of the "3" group must be followed by a relatively long interval in order to obtain a wide space between the "3" group and the succeeding "2" group, etc. This is adequately illustrated in Figure 1 where the code number "321" is shown substantially as it would appear on the radar viewing screen.

When the pilot or navigator of an interrogating aircraft wishes to determine his position with respect to a beacon he sets in operation a transmitter which sends out a continuous series of exceedingly short equally spaced electrical impulses. Each impulse has, usually, a duration of the order of one or two microseconds, and is a radio wave of definite microwave frequency—perhaps several thousand megacycles per second. Hence, each impulse, although very short, comprises many cycles; and a particular beacon or beacons can be tuned to respond thereto selectively. The impulses sent out by the aircraft may be spaced several hundred microseconds apart, and, in response to each such impulse received from the interrogating aircraft the beacon flashes back a series of spaced impulses indicative of the beacon code number. It will be apparent, then, that as long as the aircraft continues to send out a chain of interrogating pulses, the beacon, if within range, will continue to send back a recurrent series of groups of pulses—each group being in accordance with the code number which the beacon is set to transmit.

In Figure 4a reference numeral 11 identifies an input terminal connected through a coupling condenser 12 to the control grid of a triode 13 constituting the so-called "off" tube of the first multivibrator MV—1. Terminal 11 is also connected to the output of a receiver, not shown, which is tuned to receive interrogating signals. When the beacon is being interrogated there are impressed upon terminal 11 a series of short positive pulses or "pips," spaced in accord with the interrogating pulses transmitted by the interrogating aircraft. Each pip causes the control grid of triode 13 to go positive. The normal grid potential of said tube is so negative that no plate current flows therethrough except when it is activated by one of the aforementioned positive pips, and thereafter for a short period of time determined by certain constants of the multivibrator as presently will be explained. For the above-stated reason triode 13 is referred to as the "off" tube.

The grid of triode 14 is connected through a high resistance 15 to the positive plate supply. There is accordingly a small grid-cathode current in tube 14 and the grid is normally at a potential very slightly above that of the cathodes of the two tubes. At such a grid potential plate current flows through tube 14 via plate resistance 16 and to ground by way of series cathode resistances 17 and 18. The values of the latter resistances are such that the cathodes are normally quite positive with respect to ground. It will be observed that the grid of tube 13 is normally at ground potential and this is sufficiently below normal cathode potential to cut off tube 13.

When the grid of tube 13 goes suddenly above cut-off in response to an interrogating pip, the plate current of that tube rises abruptly from zero and the potential at junction 19 drops just as abruptly to a predetermined extent, depending upon the value of the plate current. This sudden potential drop is transmitted through condenser 21 to the grid of "on" tube 14, causing the potential of that grid to drop well below cut-off; and said grid remains below cut-off until the charge on condenser 21 is normalized to a certain extent by current through resistance 15. This, of course, results in shutting off the plate current that normally flows through tube 14 and resistances 17 and 18 and correspondingly reduces the cathode potential of both tubes 13 and 14. Hence, the grid of tube 13 remains above cut-off for a certain period of time after the triggering pip has fully decayed; and the plate current through that tube is maintained throughout that period. As soon as the potential on the grid of tube 14 (which at first rises exponentially) has been restored sufficiently to cause plate current to start flowing in that tube, negative bias is rapidly built up on the grid of tube 13 and, by virtue of regeneration, the potential on the grid of tube 14 rises abruptly.

The time required for the multivibrator to complete a cycle of operation (its period) determines the spacing between code pulses and depends, among other factors, upon the extent to which the cathode potential is diminished by the cutting off of tube 14. The greater the decrease of cathode potential the greater must be the rise of grid potential in tube 14 before cut-off is reached in that tube on the upswing of the grid. The presence of condenser 22 in circuit has the effect of maintaining the cathode potential, because that condenser must discharge through resistance 18 in order to bring about a lowering of cathode potential; and the time constant of that condenser and resistance may be large by comparison with the period of the multivibrator. With condenser 22 connected in circuit the period of multivibrator MV—1 is relatively short, and this means that a short interval will occur between the first code pulse and the one to follow. With condenser 22 out of circuit, the period of said multivibrator will be longer and, accordingly, the interval between the first and second code pulses will be long.

The function of each multivibrator is to produce, first, a positive pulse to modulate the beacon transmitter and, following a prescribed time interval, to produce a second positive pulse for triggering the next succeeding multivibrator. Obviously, the last multivibrator in the series does not need to produce a second pulse.

Having explained how the multivibrator is caused to go through its cycle of operations it is now in order to point out wherein the above-mentioned first and second positive pulses are obtained. The first positive pulse appears at junction 23 when the plate current through tube 14 is cut off. This takes place at the instant when junction 19 goes negative as a result of the triggering pip. The first positive pulse is transmitted via condenser 24 and conductor 25 to one control grid of a twin triode 26 and is differentiated by condenser 24 in co-operation with resistance 27. The second positive pulse is obtained by differentiating the back end of the approximately square wave negative pulse appearing at junction 19. Differentiation is accomplished by condenser 29 in co-operation with resistance 30, and the result is a positive pip applied to the grid of the "off" tube of the second multivibrator MV—2. It may be well to mention that although the leading edge of the pulse appearing at junction 19 is differentiated and produces a negative pip on the grid of the "off" tube of the second multivibrator, this has no effect since the grid in question is already below cut-off.

Alternate multivibrators, MV—1, MV—3 and MV—5 are connected through conductor 25 to the same control grid of tube 26, and the remaining multivibrators are connected through conductor 31 to the other control grid of the same tube. It is unnecessary to explain the reason for this because it is immaterial as respects the invention herein claimed and, in addition, is a part of the prior art.

Each of the multivibrators except MV—6 has a condenser corresponding to condenser 22; these are numbered 32, 33, 34 and 35. Since MV—6 is the last of the series it has no need for a corresponding condenser.

What has been described up to this point is prior art, except for the employment of condensers 22 and 32—35. Heretofore, other means were employed for determining the spacing between code pulses; and it was necessary, in setting the coder to produce a desired arrangement of code pulses, to adjust the period of each multivibrator individually, after determining from the desired code number which multivibrators should have long periods and which should have short periods.

The gang switches shown in Figure 4b eliminate substantially all mental effort in that there is required only the turning of three control knobs to indicia corresponding respectively to the three digits of a listed code number—all of which can be performed in a matter of seconds.

The lowest of the listed code numbers is "110" which involves propagating only two pulses from the beacon and entails the use of only the first two multivibrators, MV—1 and MV—2. Therefore, if the beacon is to be set at "110," multivibrator MV—3 should be cut off. This is accomplished by interruption of the cathode-plate circuit of MV—3 which automatically cuts off, in addition, MV—4, MV—5, and MV—6. But the cutting off of MV—4, MV—5, and MV—6 is not in any instance made dependent upon the cutting off of MV—3 since the switching arrangement shown takes care of separately cutting the cathode-plate circuits of those multivibrators even though the cathode-plate circuit of MV—3 is open.

The gang switch marked "hundreds group" may, as here shown, comprise nine rotary switches on a common shaft, which are manually operable simultaneously through the medium of a suitable knob or handle. Each switch of the hundreds group comprises three fixed contacts marked "1," "2," and "3" to indicate the numerical value of the first digit. Each of said switches also includes a rotary contact 36—44 inclusive, which engages the fixed contacts successively and individually in response to rotation of the common shaft. The nine switches of the hundreds group are identified by reference numerals HG—1 to HG—9 inclusive.

Rotary contactor 36 of switch HG—1 is connected to condenser 22 via conductor A and is adapted to ground one side of that condenser when switch HG—1 in either position "2" or "3," but not when said switch is in position "1." This is explained by the fact that if the first digit is "1," the first outgoing pulse must be followed by a long interval and, consequently, condenser 22 must be out of circuit. If, on the other hand, the first digit is either "2" or "3" the first outgoing pulse must be followed by a short interval and, accordingly, condenser 22 must be in circuit.

Rotary contactor 37 of switch HG—2 is connected to condenser 32 via a conductor B and is operative to ground that condenser when switch HG—2 is in position "3." This is necessarily true because if the hundreds digit is "3" the second outgoing pulse will inevitably be followed by a short interval. But if the first digit is "1" the second pulse may or may not be followed by a long interval; whereas if the first digit is "2" the second pulse is invariably followed by a long interval. Therefore, when the hundreds switch is in the "2" position condenser 32 need never be grounded.

The cathode-plate resistances 17 and 18 of

MV—1 and the corresponding resistances of MV—2 are permanently grounded because those two multivibrators are always used, no matter what the code number may be. This is because the lowest code number here employed, namely "110," requires transmission of two pulses, and by the same token, where the sum of the digits of the code number is less than three ("110" being here the only instance), multivibrators MV—3–MV—6 are not employed; and if said sum is less than four, multivibrators MV—4–MV—6 are not employed. Similarly, for a sum less than five, multivibrators MV—5 and MV—6 would be out of use; and, for a sum less than six, MV—6 is not required.

What has been said with respect to the switching into and out of circuit of condensers 22 and 32 is applicable to condenser 33. That is to say, switch HG—3 of the hundreds group is arranged so that condenser 33 will be grounded or ungrounded, depending upon whether the following interval is to be long or short. If the first digit is "3" the outgoing pulse from MV—3 is necessarily followed by a long interval, and the "3" contact of switch HG—3, accordingly, never grounded. However, contacts "1" and "2" of that switch may be grounded through the "tens" or "units" group switches, depending upon the code number. It will be observed that contacts "1" and "2" of switch HG—3 of the "hundreds" group are never grounded except through other switches; and the same applies to the remaining switches of the "hundreds" group which control condensers 34 and 35.

Switches HG—4, HG—6, HG—8 and HG—9 of the "hundreds" group are connected in the cathode-plate circuits of MV—3–MV—6, respectively, and they operate, in conformity with the code numbers, to render their respective multivibrators active or inactive as the situation may demand.

The "tens" group switches may consist of eight ganged rotary switches labeled TG—2 to TG—9 respectively. These each include three fixed contacts marked "1," "2" and "3," respectively, and a rotary contact 45–52 inclusive. The rotary contact of each is permanently connected to one or more fixed contacts of the "hundreds" group.

Some of the fixed contacts of the "tens" group are permanently grounded; others are permanently ungrounded, while the remainder may be grounded or ungrounded through the switches of the "units" group. It would be a work of supererogation to trace out each of the numerous connections because anyone skilled in the art having in mind the principles involved, as already expounded, will have no difficulty in understanding the reason for each connection; and, what is more, will have no difficulty in adapting the invention to a larger or smaller number of code combinations.

It will be recalled that the units digit of a listed code number may be zero as well as "1," "2," or "3." Consequently, switches UG—3 to UG—7 of the "Units group" each includes a zero position. This is indicated in Figure 4b by means of fixed contacts marked "0." These contacts need not actually be present in the switch since they are always blanks; but it is necessary to have a corresponding zero switch position, as will be self-evident; and it is equally true that all the fixed contacts which are never grounded could actually be omitted, although the corresponding switch positions should be retained.

In the example illustrated, the rotary contactors are shown in full lines in the positions which they would occupy to set the beacon at the code number "110." The same contactors are shown in dotted lines in the positions which they would assume for the code number "321."

While it has been advantageous from the standpoint of clarity of illustration to indicate switches of the rotary gang type, in practice there would usually be employed so-called wafer type switches such as are now widely used in the radio art.

Obviously, the system described can be expanded, without departing from the invention, to accommodate code numbers having any number of digits. Likewise, the numerical value of each digit can be made larger or smaller as desired—there being no restriction on the possible number of multivibrators and no restriction on the possible number of gang switches.

I claim:

1. A system comprising three or more pulse generators in tandem, each of said generators being operative to propagate an outgoing pulse, each of said generators, except the last in order, being further operative to propagate a second pulse which follows by a predetermined time interval the outgoing pulse propagated by the same generator, means whereby the said second pulse propagated by each generator is caused to trigger the next succeeding generator, each of said generators, except the last in order, including a parameter capable of being switched into and out of circuit to change the time interval between that generator's outgoing pulse and its aforementioned second pulse, whereby to regulate the time intervals between outgoing pulses in conformity with a prescribed code number, which code number consists of at least two digits the numerical sum of which is at least three, at least two manually operable gang switches including one gang switch representing the "tens" position of a numerical code combination and a second which represents the "units" position of said code combination, each of said gang switches comprising a plurality of individual switches, each of said gang switches having a plurality of positions of adjustment each representing an individual number, said gang switches being connected with said generators and with each other in such manner that when each is adjusted in conformity with the numerical value of the code digit which it represents, the aforementioned outgoing pulses are so spaced as to spell out the code number to which the gang switches are set.

2. A system comprising three or more pulse generators in tandem, each of said generators being operative to propagate an outgoing pulse, each of said generators, except the last in order, being further operative to propagate a second pulse which follows by a predetermined time interval the outgoing pulse propagated by the same generator, circuit connections whereby the said second pulse propagated by each generator is caused to trigger the next succeeding generator, each of said generators, except the last in order, including a condenser capable of being switched into and out of circuit to change the time interval between that generator's outgoing pulse and its aforementioned second pulse, whereby to regulate the time intervals between outgoing pulses in conformity with a prescribed code number, which code number consists of at least two digits the numerical sum of which is at least three, at least two manually operable rotary gang switches including one gang switch representing the "tens" position of a numerical code combination and a second which represents the "units" position of said code combination, each of said gang switches comprising a plurality of individual rotary switches, each of said gang switches having a plurality of positions of adjustment, each representing an individual number, said gang switches being connected with said generators and with each other in such manner that when each is adjusted in conformity with the numerical value of the code digit which it represents, the aforementioned outgoing pulses are so spaced as to spell out the code number to which the gang switches are set.

3. A system for generating and transmitting chains of electric pulses, each chain being composed of spaced groups of pulses, whereof each group corresponds individually to a particular code number digit, each group comprising one or a plurality of closely spaced pulses corresponding numerically to the code number digit which it represents, the groups of each chain being widely spaced in order to effect clear-cut differentiation therebetween, said system comprising a plurality of pulse generators arranged in tandem, each of said pulse generators being operative, in turn, to generate and propagate an outgoing code pulse, each of said generators, except the last in order, being further operative to generate a second pulse for triggering the next succeeding pulse generator, each of said pulse generators, except the last in order, having means for delaying for a predetermined time interval its aforementioned second pulse following its aforementioned outgoing pulse, each of said pulse generators, except the last in order, including an element which when connected in circuit causes said time interval to be short and which when not connected in circuit causes said time interval to be long, a manually operable gang switch corresponding to the highest order digit of the code number, said gang switch including a plurality of simultaneously operable individual switches associated individually with one of said pulse generators except the last in order thereof, each of said individual switches having a movable contact member connected with the aforesaid element of its associated pulse generator, each of said individual switches comprising a plurality of fixed contacts adapted to be engaged successively by their associated movable contact member, each of said fixed contacts corresponding to a particular numerical value of the highest order code digit, some of said fixed contacts being permanently blank electrically, others of said fixed contacts having circuit connections for controlling their respectively associated aforementioned elements, which circuit connections do not include any other gang switch, and still others of said fixed contacts having circuit connections for controlling their respectively associated aforementioned elements but which are capable of being completed only through one or more other gang switches hereinafter mentioned, a second manually operable gang switch including a plurality of individual switches associated individually with all but the first and last in order of said pulse generators, each of said last-mentioned individual switches having a movable contact member which is connected to one or more fixed contacts of the individual switches of the first-mentioned gang switch, the arrangement being such that the aforementioned element of each said pulse generator, except the last in order, is either connected in circuit or not connected in circuit depending upon whether the outgoing pulse generated by its individual pulse generator is to be followed by a long or short time interval.

4. A system operative to generate and propagate chains of electric pulses arranged in groups according to numerical code combinations, the system being capable of being adjusted to propagate selectively any desired one of a plurality of predetermined numerical code combinations, said system comprising a plurality of pulse generators arranged in tandem, said generators being operative consecutively, each to propagate an outgoing code pulse, and each of said generators, except the last in order, being further operative to generate a triggering pulse which is utilized to activate the next succeeding generator, the time interval between the outgoing pulse propagated by any one of said generators, except the last in order, and the outgoing pulse propagated by the next succeeding generator being determined by the time interval between the outgoing pulse and triggering pulse of said any one generator, a first gang switch representing the highest order digit of a code number, a second gang switch representing the second highest order digit of a code number, and a third gang switch representing the third highest order digit of a code number, each of said gang switches being adjustable selectively and individually in conformity with any one of a plurality of numbers, the several gang switch adjustments being determinative of the code number to be propagated, each of said gang switches including a plurality of individual switches, each of said individual switches including a movable contact member and a plurality of fixed contacts engageable consecutively by said movable contact member, each of said generators, except the last in order, comprising an element whose inclusion in circuit determines whether the time interval between the outgoing pulse and the triggering pulse of that generator will be long or short, the said element which forms a part of the said generator which is first in order being connected to the movable contact member of one of the individual switches included in the first gang switch, the fixed contacts of the last-mentioned individual switch being blank and, therefore, incapable of connecting the associated element in circuit, the remainder of the fixed contacts of said individual switch having circuit connections which operate to connect the said element in circuit when they are contacted by their associated movable contacts, said first gang switch including a second individual switch having a movable contact and a plurality of fixed contacts, said second individual switch having its movable contact connected with the aforementioned element individual to the second-in-order of said generators, said second individual switch being operative to include its associated said element in circuit or otherwise, depending upon whether the third outgoing pulse follows the second outgoing pulse by a long interval or a short interval, certain of the fixed contacts of said second individual switch being connected to the movable contact of a third individual switch which is similar to said second individual switch and which third individual switch is a component of said second gang switch.

5. A switching system for coding a pulse transmitter, said switching system comprising a hundreds gang switch, a tens gang switch and a units gang switch, each of said gang switches comprising a plurality of rotary switches ganged together for simultaneous rotation, each of said rotary switches comprising a rotary contact member and a plurality of fixed contacts, an individual conductor connecting each of the rotary contact members of the hundreds gang switch with an individual pulse generator forming a part of said transmitter, certain of the fixed contacts of said hundreds group being grounded to complete a circuit through its associated aforementioned individual conductor and its associated rotary contact member, others of the fixed contacts of the hundreds group being connected to individual rotary contact members of the tens group, certain of the fixed contacts of said tens group being grounded, others of the fixed contacts of the tens group being connected to individual rotary contact members of the units group, certain of the fixed contacts of the units group being grounded.

6. In a system for producing a series of time-spaced pulses indicative of a predetermined code number, a plurality of pulse generators adapted to produce successive groups of pulses each of which groups is indicative of a digit of the code number, a plurality of digit selector switches each corresponding to a certain digit of the code number and each having a plurality of selectable positions corresponding respectively to different numbers, and means controlled by said switches for modifying the operation of said generators so as to produce a certain series of pulses whose respective groups are determined by the respective selected positions of said switches, whereby the indicated code number may be changed at will by positioning each of said switches according to the number which it is desired to assign to the corresponding digit.

7. In a radio beacon transmitter adapted to transmit a series of time-spaced pulses indicative of a predetermined code number, means for producing successive groups of pulses each of which groups is indicative of a digit of the code number, a plurality of digit selector switches each corresponding to a certain digit of the code number and each having a plurality of selectable positions corresponding respectively to different numbers, and means controlled by said switches for modifying the operation of first-mentioned means so as to produce a certain series of pulses whose respective groups are determined by the respective selected positions of said switches, whereby the indicated code number may be changed at will by positioning each of said switches according to the number which it is desired to assign to the corresponding digit.

8. In a system for producing a series of time-spaced impulses indicative of a predetermined code number, a plurality of pulse generators adapted to produce successive groups of pulses indicative of successive digits of the code number, switchable circuit means for modifying the operation of said generators so as to vary the spacing of the pulses and thus vary the digit-indicative groups to change the code number, and a plurality of digit selector switches arranged to control said switchable circuit means so as to establish a code number whose digits are determined by the settings of the respective switches.

9. In a system for producing a series of time-spaced pulses indicative of a predetermined code number, a plurality of multivibrators adapted to produce successive groups of pulses indicative of successive digits of the code number, switchable circuit means for varying the cycle period of different ones of said multivibrators so as to vary the spacing of the pulses and thus vary the digit-indicative groups to change the code number, and a plurality of digit selector switches arranged to control said switchable circuit means so as to establish a code number whose digits are determined by the settings of the respective switches.

10. In a system for producing a series of time-spaced pulses indicative of a predetermined code number, a plurality of multivibrators adapted to produce successive groups of pulses indicative of successive digits of the code number, switchable circuit means including a plurality of condensers for varying the cycle period of different ones of said multivibrators so as to vary the spacing of the pulses and thus vary the digit-indicative groups to change the code number, and a plurality of digit selector switches arranged to control said switchable circuit means so as to establish a code number whose digits are determined by the settings of the respective switches.

CLAUDIUS T. McCOY.

REFERENCES CITED

The following references are of record in the file of this patent:

UNITED STATES PATENTS

| Number | Name | Date |
| --- | --- | --- |
| 1,640,325 | Janson | Aug. 23, 1927 |
| 2,140,138 | Miller | Dec. 13, 1938 |